United States Patent Office

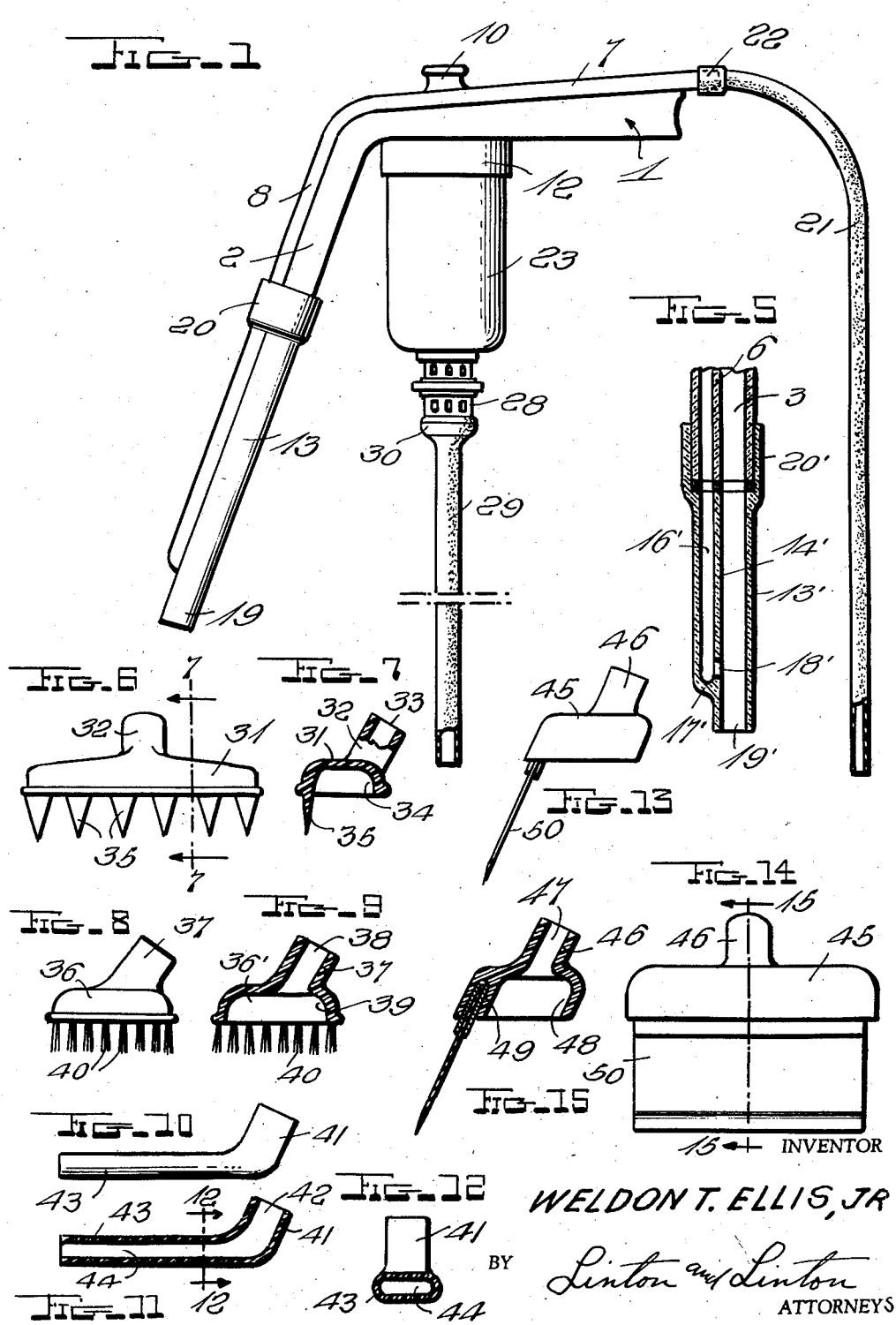

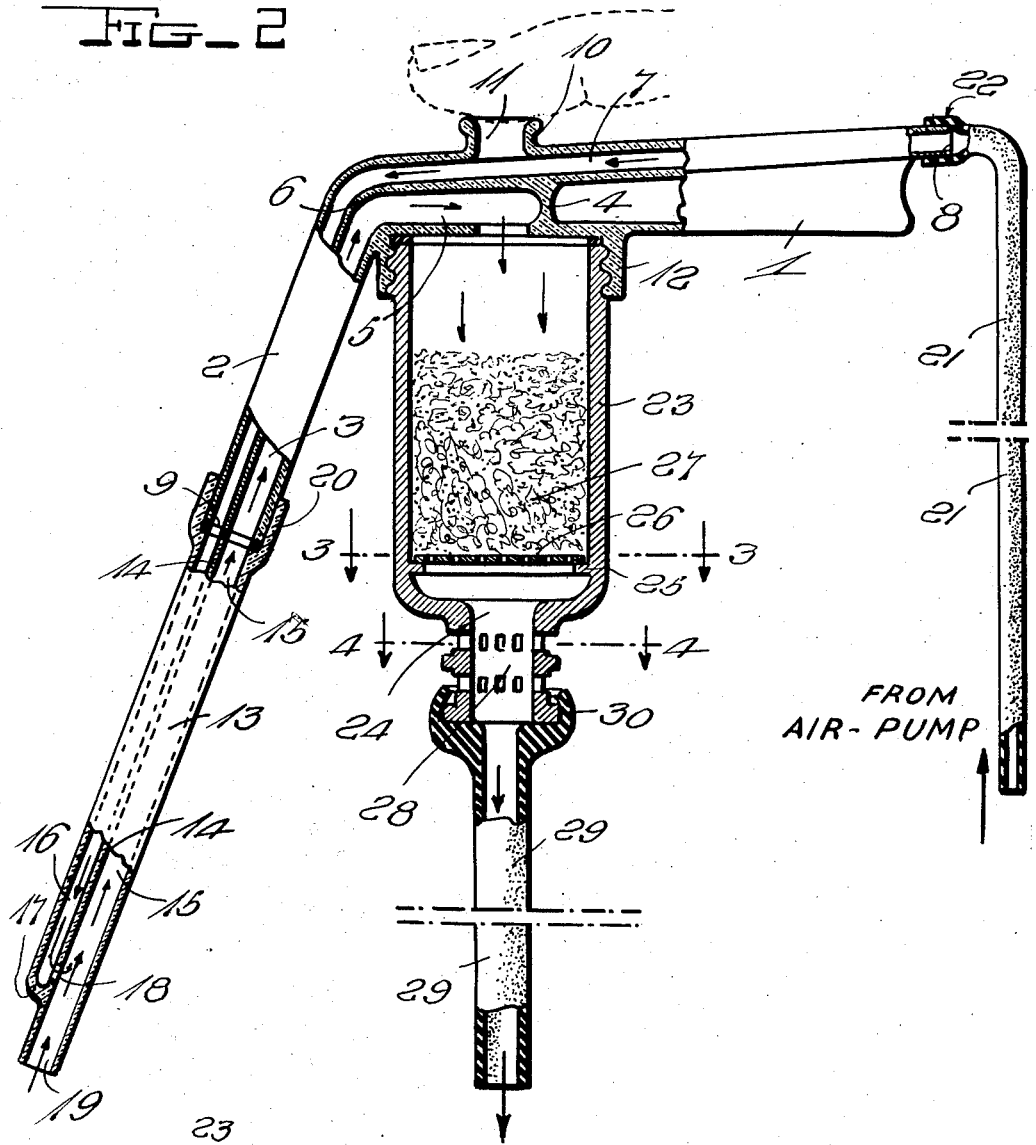

2,899,063
AQUARIUM CLEANER
Weldon T. Ellis, Jr., Arlington, Va.

Application June 17, 1955, Serial No. 516,144

2 Claims. (Cl. 210—169)

The present invention relates to devices for regenerating and cleansing the water and inert contents of aquariums and is more particularly concerned with a device for simultaneously aerating and cleansing the water contents of an aquarium while further loosening and withdrawing undesirable material from the inert contents of the aquarium.

The principal object of the present invention is to provide a manually movable means capable of drawing water and material within an aquarium into and through a filter and returning the same in a cleansed and aerated condition for maintaining the aquarium contents in a healthful condition for the fish therein and which means can employ interchangeable members capable of loosening matter adhering to the aquarium or its contents, which matter is undesirable, and positioning such loosened matter for being drawn with the water through the filter as aforementioned.

A further and important object of the present invention is to provide a portable cleaner for aquariums, capable of being attached to a vacuum cleaner or pump, for drawing water and material through the portable cleaner into and through a filter for cleansing the same and at the same time adding air to the cleansed water whereupon it is returned to the aquarium.

An equally important object of the invention is to provide an aquarium cleaner of a simple construction which can be economically produced and which cleaner can employ various sized extensions and also various types of elements for removing undesirable material from within the aquarium.

Further objects of the invention will be in part obvious and in part pointed out in the following description of the accompanying drawings, wherein:

Fig. 1 is a side elevation of the present device.

Fig. 2 is an enlarged view of Fig. 1, but partly in section to show interior details of the device.

Fig. 3 is a top view of a filter forming a part of the present structure.

Fig. 4 is a cross sectional view taken on line 4—4 of Fig. 2.

Fig. 5 is a longitudinal section of a modified form of an extension for the present apparatus.

Fig. 6 is a front elevation of a rake attachment.

Fig. 7 is a cross sectional view taken on lines 7—7 of Fig. 6.

Fig. 8 is an end view of a brush attachment.

Fig. 9 is a cross sectional view of said brush attachment.

Fig. 10 is a side elevation of a rock cleaning attachment.

Fig. 11 is a longitudinal section of said rock cleaning attachment.

Fig. 12 is an end view of the device of Fig. 10.

Fig. 13 is a side elevation of a scraper attachment.

Fig. 14 is a front elevation of said scraper attachment; and

Fig. 15 is a cross sectional view taken on line 15—15 of Fig. 14.

Referring now more particularly to the accompanying drawings wherein like and corresponding parts are designated by similar reference characters, numeral 1 refers to a handle for the device to be manually gripped and moved thereby. Said handle is preferably of a one piece construction being readily formed from glass, plastic or metal and has an angularly extending portion 2 containing a bore 3 extending throughout the length thereof and into handle 5 terminating at a wall 4, while said handle has an opening 5 extending into said bore adjacent said wall.

An interior wall 6 extends the length of said handle and its angular projection 2 separating bore 3 from a bore 7 extending the length of said handle and said angular portion 2 being open at both ends as at 8 and 9. Handle 1 further has a top annular extension 10 having a bore 11 opening into said passage 7. Handle 1 further has an annular ring 12 formed therewith or connected thereto on a side opposite to said projection 10. Said ring has a threaded interior surface.

When desired, the length of handle portion 2 can be extended by adding an extension 13 or 13' thereto. Extension 13 has an interior wall 14 separating a bore 15 which extends the longitudinal length of said extension from a bore 16 closed at its lower end by a wall 17 but joined to passage 15 by an opening adjacent said wall. Extension 13 has a tapered end portion 19 for receiving attachments thereto and an enlarged opposite end 20 capable of a slidable fit over the end of section 2 whereby bores 3 and 15 are aligned and bores 7 and 16 are also aligned.

Handle 1 at the opening 8 of passageway 7 has a flexible tube 21 attached thereto by its enlarged end 22 slidably fitting thereon. Said tube 21 is capable of attachment to a conventional air pump or to the air pressure end of vacuum cleaners provided with means for connecting pressure attachments thereto.

A threaded end cylindrical container 23 is detachably connected to ring 12 by being screwed thereinto. Said container has an opening 24 in its base and an annular internal flange 25 adjacent thereto. A perforated disc 26 is positioned on said flange with filtering material 27 mounted thereabove.

An aerator 28 of conventional design is mounted through said opening 24, while a flexible hose 29 has an enlarged end 30 fitting over a portion of said aerator for being connected thereto.

When it is desired to rake sand or the like contained on the bottom of an aquarium, rake attachment 31 having a tubular extension 32 can be connected to end 19 of extension 13 by slidably inserting said end 19 within bore 33 of extension 32 which opens into the cavity 34 provided in the bottom of said attachment. A plurality of teeth 35 extend downwardly from said attachment adjacent said cavity whereby material raked up by said teeth are gathered within said cavity and can be drawn through bore 33.

In Fig. 8 there is shown a cleaning brush attachment consisting of an annular head 36 with an extension 37 whose bore 38 is capable of receiving end 19. Said head has a bottom recess 39 with bristles 40 extending therearound whereby the sides of the aquarium can be brushed for example and the material loosened therefrom drawn within cavity 39 through passage 38.

In Figs. 10, 11 and 12 there is shown a rock cleaner attachment consisting of an extension 41 having a bore 42 from which angularly extends an elongated tube 43 whose bore 44 opens into passageway 42. Said passageway 42 is capable of fitting over the end 19 of extension 13 and the elongated portion 43 can then be inserted among the rocks and other recesses within the aquarium for cleaning otherwise inaccessible surfaces and the like.

When it is necessary to scrape the surfaces within the aquarium to remove tightly adhering but undesirable matter therein, the attachment shown in Figs. 13, 14 and 15 can be employed. This scraper attachment has an elongated head 45 from the central portion of which extends a tubular connector 46 whose bore 47 will slidably fit on end 19 of extension 13. Said bore 47 further opens into recess 48 formed within the bottom of said head while an elongated slot 49 is also formed in the bottom of said head and is capable of slidably receiving in frictional engagement the top portion of a razor blade 50 for detachably retaining said blade to said head.

In the operation of the present aquarium cleaner tube 21 is connected at its free end to a source of air under pressure whereupon the air is passed into bore 7 and can escape through opening 11. The user of the present device grips handle 1 in one hand placing his thumb across opening 11 thereby controlling or stopping the flow of air therefrom. When said opening 11 is thus closed, the air is directed into passage 16 of extension 13 and then passes through opening 18 into bore 15. When the operator pushes extension 13 within the water in the aquarium, the air from opening 18 will move upwardly within bores 15 and 3 carrying the surrounding water therewith creating a suction at end 19. The water and included material carried thereby by the air empties through opening 5 due to the wall 4 into the container 23. The liquid and material therewith is first engaged by the filtering material 27 and then the perforated disc 26 for being filtered removing relatively large particles from the water. The cleansed water passes through the aerator 28 drawing air therethrough whereupon the water and air are mixed and this mixture then passes through tube 29 which can be positioned for directing the cleansed aerated water back into the aquarium.

From time to time it is necessary to cleanse the sand, rocks, walls and other material within the reservoir and for this purpose one of the attachments shown in Figs. 6 to 15 inclusive can be used. Thus with the rake shown in Figs. 6 and 7 connected to end 19 and the teeth 35 passed through sand in the aquarium, undesirable material can be gathered from the sand and drawn from cavity 34 through opening 33 and raised with the water in passage 15 upwardly through passage 3 and from there through opening 5 into the filter for being separated from the water.

The walls of the reservoir can be scrubbed by moving bristles 40 of the attachments shown in Figs. 8 and 9 when connected to said end 19 and the material so loosened will be drawn through cavity 39 and passage 38 into bore 15 upwardly and through the filter.

However, when it becomes necessary to reach into crevices as for example among stones within the aquarium, the attachment of Figs. 10 to 12 can be connected to end 19 and the elongated portion 43 guided among the rocks for drawing water and the like material into passage 44 and upwardly to the filter.

Some material forming in reservoirs adheres with considerable tenacity and in order to loosen the same it is desirable to use a sharp instrument. In such instances, the scraper attachment of Figs. 13 to 15 inclusive may be used by inserting end 19 within bore 47 and then scraping the surfaces with the sharp edge of the razor blade 50. The loosened material will be drawn into the recess 48 and then through bore 47 with the surrounding water upwardly to filter 23. The razor blade can be replaced as required by sliding the head thereof from recess 49 and inserting a new blade.

In Fig. 5 there is shown a modified extension 13' which is similar to extension 13, but of a shorter length and the corresponding parts thereof have been indicated by reference characters 14' to 20' which are similar to the portions 14 to 20 respectively of extension 13, but of shorter length.

The present invention is capable of considerable modification and such changes thereto as come within the scope of the appended claims are deemed to be a part of the present invention.

I claim:

1. An aquarium cleaner comprising an angular elongated rigid one piece handle having an end portion to be manually held in the operation of the cleaner, said handle having a pair of bores therein each closed at one end and having an open end with the open ends of said bores being at opposite ends of said handle to one another and both bores being in communication adjacent the open end of one of said bores, and the closed end of the other of said bores, means providing air under pressure to the opening end of the other of said bores, an annular internally threaded flange provided on said handle at said end portion to be manually held, said handle having an external opening placing said first mentioned bore closed end in communication with the area within said flange, an open top container having external threads in threaded engagement with said flange, filtering material positioned within said container, and said container having a bottom outlet opening.

2. An aquarium cleaner as claimed in claim 1, wherein said handle has an external opening on an opposite side of said handle to said first mentioned opening, in communication with the other of said bores whereby a user's thumb can be placed thereacross controlling the flow of compressed air through said bores.

References Cited in the file of this patent

UNITED STATES PATENTS

| 307,324 | Pattison | Oct. 28, 1884 |
| 729,718 | Blaisdell | June 2, 1903 |
| 2,316,832 | Ahnigdes | Apr. 20, 1943 |
| 2,595,826 | Winks et al. | May 6, 1952 |
| 2,643,104 | Holden | June 23, 1953 |
| 2,672,987 | Hutchinson | Mar. 23, 1954 |
| 2,715,609 | Hansen | Aug. 16, 1955 |
| 2,770,366 | Puzarowski | Nov. 13, 1956 |

FOREIGN PATENTS

| 580,795 | Great Britain | Sept. 19, 1946 |
| 692,623 | Great Britain | June 10, 1953 |
| 823,068 | Germany | Nov. 29, 1951 |